United States Patent [19]
Uemura et al.

[11] Patent Number: 5,844,169
[45] Date of Patent: *Dec. 1, 1998

[54] WIRE DUCT WITH A WEAKENED AND READILY DEFORMABLE WALL FOR DISPLACING WIRES HELD WITHIN

[75] Inventors: Kazuhiro Uemura; Koji Yamashita, both of Yokkaichi, Japan

[73] Assignee: Sumitomo Wiring Systems, Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 693,650

[22] Filed: Aug. 9, 1996

[51] Int. Cl.⁶ ........................................ H02G 3/00
[52] U.S. Cl. .......................... 174/68.3; 138/119; 174/101
[58] Field of Search ................. 174/68.3, 72 R, 174/72 A, 72 C, 95, 97, 100, 101, 48, 99 E, 68.1; D13/155; 138/119, 178

[56] References Cited

U.S. PATENT DOCUMENTS

| | | | |
|---|---|---|---|
| 594,998 | 12/1897 | Lyle | 285/137.1 |
| 3,812,282 | 5/1974 | Johansson | 174/68.3 |
| 4,093,761 | 6/1978 | Taylor | 428/43 |
| 4,136,257 | 1/1979 | Taylor | 174/68.3 |
| 4,175,593 | 11/1979 | Sack | 138/110 |
| 5,003,129 | 3/1991 | Toyomasu et al. | 174/69 |
| 5,016,842 | 5/1991 | Suzuki et al. | 248/68.1 |
| 5,024,251 | 6/1991 | Chapman | 138/92 |

FOREIGN PATENT DOCUMENTS

| | | |
|---|---|---|
| 2 536 219 | 5/1984 | France . |
| 40 17 781 A1 | 12/1990 | Germany . |
| 41 04 968 A1 | 9/1992 | Germany . |
| 42 30 636 A1 | 3/1994 | Germany . |
| 2 268 837 | 1/1994 | United Kingdom . |
| WO 93/18565 | 9/1993 | WIPO . |

*Primary Examiner*—Bot L. Ledynh
*Assistant Examiner*—Kamand Cuneo
*Attorney, Agent, or Firm*—Anthony J. Casella; Gerald E. Hespos; Ludomir A. Budzyn

[57] ABSTRACT

A protector for accommodating cables therein is provided with an elongated tubular body (1;101;201;301) having at least one weakened wall portion (5;105;205;305) which allows the body (1;101;201;301) to be deformed on impact, thereby releasing the cables to protect them from damage and preventing occurrence of a short circuit in an accident.

13 Claims, 4 Drawing Sheets

WIRE DUCT WITH A WEAKENED AND READILY DEFORMABLE WALL FOR DISPLACING WIRES HELD WITHIN

BACKGROUND OF THE INVENTION

1. Field of the Invention

The present invention relates to a protector for protectively accommodating cables therein and, more particularly to a protector used in automotive industry for securely holding and protecting cables or at least one wiring harness connectable to one pole of a battery. The protector is mounted on parts of a car body or a body panel connected to the other pole of the battery. In particular, the protector is so mounted as to horizontally extend along a cowl panel in the passenger compartment.

2. Description of the Prior Art

From U.S. Pat. No. 5,016,842, a protector for a wiring harness is known. This known protector includes one or two elongated body portions for accommodating a wiring harness therein. The elongated body portion includes a cover provided with a hinge means so that it can be closed after the insertion of the wiring harness thereinto. The body portion and the cover generally have a uniform and constant material thickness and strength.

One disadvantage of the prior art protectors results from an inability of the wiring harness to escape from the protector even if the protector is considerably deformed upon an accident. Specifically, when this protector is used to protectively accommodate cables or a wiring harness in an automotive vehicle, there arises a risk that a short circuit might occur when the protector and the contained cables or wiring harnesses are squeezed upon a crash, in particular a head-on collision. Specifically, the cables might be trapped between the cowl panel and a reinforcement member of the car body, and their sheaths may be damaged by metal parts which are connected to the pole of the battery different from the one connected with the cables. The resulting short circuit is likely to cause a burnout of the cables.

It is an object of the present invention to provide a protector for accommodating cables therein which reduces the likeliness of and, preferably, prevents occurrence of a short circuit in an accident.

SUMMARY OF THE INVENTION

The above object is achieved by a protector for accommodating cables therein, comprising an elongated tubular body having at least one weakened wall portion which allows the body to be deformed, thereby displacing the cables. In particular, the inventive protector allows the cables to be displaced out of a possible squeezing zone, in particular by gravity acting on the cables, thereby eliminating a risk of causing a short circuit and possibly a fire.

Preferably, the weakened wall portion is openable when a predetermined amount of deformation occurs. In particular, when the weakened wall portion is opened or broken, the cables may not only be displaced in the protector, but also escape therefrom in order to further diminish a risk of the cables being squeezed and therefore a risk of short circuit.

Preferably, an engagement portion is alternatively or supplementarily provided as the weakened wall portion, wherein the engagement portion is disengageable upon deformation of the protector. In particular, a predetermined portion, in particular a lower portion of the body is provided with two engagement means or one engageable means and one hinge means such that, upon deformation, the engagement means, e.g. a locking device is released, thereby opening the portion with respect to the body. By providing the engagement portion, an exact design of the protector is possible which allows the protector to be openable when an exact predetermined amount of deformation occurs. The engagement portion is preferably a locking portion, or simply a biased abutment engagement portion or the like which is located on the side of the body toward which the cables will be displaced.

The weakened wall portion preferably comprises thinned portions and/or notches, wherein it may entirely or only partially be thinned. In order to thin the weakened wall portion, notches or grooves may also be provided, which may be located on the inner side or outer side of the body, or may be disposed on both sides of the body. When the thinned wall portion is provided with notches or grooves on the both sides of the body, it is preferred that the patterns of the outer and inner surfaces of the weakened wall portion created by these notches or grooves be offset with respect to each other. The preferred protector has a predetermined breaking point or fragility which can be exactly designed by choosing an appropriate thinning pattern in consideration of the size and material used for the protector.

The weakened wall portion preferably comprises a material having a lower rigidity and/or stiffness. In this way, the weakened wall portion can also be made fragile and deformable. By providing the weakened wall portion comprising the material which is less stiff than the remaining body, the cables contained in the body can be displaced, disengaged or discharged with enhanced readiness.

Preferably, the protector is designed such that the deformation of the elongated body urges the cables to the weakened wall portion. In particular, the body may be designed such that, upon deformation, one wall portion, regardless of whether it is thinned or not thinned, will apply a pressure to the cables contained in the body, thereby biasing them toward the deformed or opened weakened wall portion. Preferably, the cross section of the body is tapered at the end which is hardly subject to deformation. Further, the body may be provided with sliding faces in order to facilitate the movement or discharge of the cables.

The weakened wall portion preferably extends in the longitudinal direction of the elongated body. In particular, the weakened wall portion extends over the entire length of the elongated body such that the deformation or opening occurs along the entire protector. Alternatively, webbing means may be provided in order to define two or more sections of the weakened wall portion along the extension of the body. By providing the webbing means, when the deformation or opening of the protector occurs at a specific location, the contained cables will be moved or discharged in this specific area while still being retained in the remaining body portion.

Further, the weakened wall portion is preferably located at a substantially lower portion of the elongated body, which is in particular deformable by pressing the side walls of the body toward each other. By providing the weakened wall portion at the lower portion of the body, the cables are allowed to move or escape from the protector by simple action of gravity.

It is generally preferred that the cables in the protector be at least partially unbound or unconnected. However, several cables may be connected to form small cable groups. Further, the cables in the protector may preferably be loosely arranged so as to provide extra length which allows the cables to hang downward, i.e. no tension is acting on the cables in the protector.

The weakened wall portion and a wall portion substantially opposite thereto are preferably designed such that they are deformable substantially in the same direction, whereby this substantially opposite wall portion biases the cables toward the weakened wall portion, particularly when side walls are squeezed. By providing this combination of wall portions, the action of gravity is supported or replaced. Particularly, it is possible to orient the direction of displacement of the cables in a horizontal direction by this feature.

Further, in order to sustain the action of gravity acting on the cables when the deformation or opening or breaking of the protector occurs, biasing means may be provided to bias the cables toward the weakened wall portion. The biasing means may also be used to replace the action of gravity, when the weakened wall portion and therefore the moving direction of the cables do not coincide with the direction of gravity. The biasing means is preferably formed by a leaf spring, coil spring or the like which is biased upon insertion of the cables into the protector.

The elongated body of the protector preferably comprises an openable cover which is connected with a main body, in particular via hinge means. By providing such an openable cover, preferably at a location substantially opposite to the weakened wall portion, the protector can easily be opened and closed for the insertion of the cables into the protector.

Finally, it is preferred that the cover comprise an engaging means for securing the cover to the main body. Specifically, it is preferred that the engaging means is formed as a locking device which provides a strong engagement, thereby providing a strength which is larger than that of the weakened wall portion against the deformation or breaking. In this case, the cover will not open even if the deformation of the body, in particular of the weakened wall portion occurs.

The present invention is also directed to the use of a protector for accommodating a preselected portion of wires forming a wiring harness. In particular, the use of the protector in automotive industry is preferred in order to receive the cables therein, which are specifically guided or arranged behind or below the dashboard and in particular between metal parts of the car body which are connected to the pole of the battery different from the one the cables are connected with. The preferred use of protector includes a horizontal alignment of the protector. However, the inventive protector can also be used in other orientations.

To summarize, the inventive protector provides a retaining means for cables which are to be protected, wherein the protector forms a fail-safe system which, if the protector is deformed upon an accident, allows the cables to be removed from the impact or squeezing zone, preventing the contained cables from being squeezed between metal parts. In this way, undesirable occurrences of a short circuit, a burnout of cables and/or a fire, can be avoided.

BRIEF DESCRIPTION OF THE DRAWINGS

Further features and advantages of the protector according to the present invention will become readily apparent from the following detailed description of the preferred embodiments of the invention in conjunction with the drawings wherein.

DETAILED DESCRIPTION OF THE PREFERRED EMBODIMENT

Figure 1:
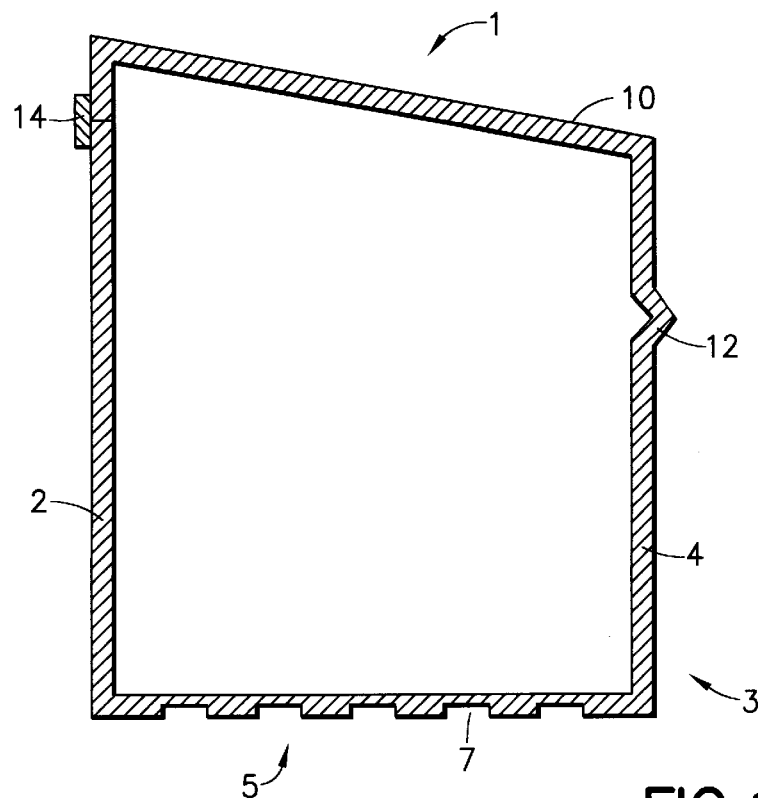
FIG. 1 is a cross section of a protector as a first embodiment of the invention.

Throughout the figures showing different embodiments of the invention, the reference signs indicating similar parts have identical two last digits, i.e. in the second and third embodiment the reference numerals were added to 100, 200 or 300, respectively.

As shown in FIG. 1, a protector 1 for accommodating cables includes a main body portion 3 having opposite sidewalls 2 and 4, and a cover 10. The cross section of the illustrated protector 1 is substantially rectangular, but it may be polygonal, round, or elliptical. The cover 10 is connected with the main body portion 3 via a hinge means 12 which can be formed of an elastically deformable material, or which can be also formed by a separate hinge means as usually provided for protectors. On the end of the cover 10 opposite to the hinge means 12, an engagement means 14 is provided. In the shown embodiment, the engagement means 14 is a locking device.

In this embodiment, the lower wall portion of the main body 3 is provided as a weakened wall portion 5 formed by a material which is more easily deformable than the material of the remaining part of the main body portion 3 and that of the cover. The weakened wall portion 5 may also be formed by a more fragile or frangible material if it is desired to be broken open.

Further, notches 7 or similar recesses are provided on an outer surface of the lower portion of the protector 1 in order to render the weakened wall portion more easily deformable. In the shown embodiment, the notches 7 are arranged at specified intervals at an outer surface lower body portion, extending in the lengthwise direction of the protector 1. The notches 7 reduce the thickness of the weakened wall portion to almost half of the material thickness of the remaining body. Of course, different thinning patterns may be used, i.e. the notches 7 might extend in a straight, a curved or zigzag manner and can intersect with each other. The notches 7 and the like may also be formed on the inner surface or on both surfaces.

The cables contained in the protector are biased downward by gravity and, accordingly toward the weakened wall portion 5. When the side walls 2, 4 of the protector 1 are compressed toward each other, the weakened wall portion 5 is deformed downward. The downward deformation of the weakened wall portion 5 allows cables contained in the protector 1 to fall downward out of the compression zone, and hence out of a zone where the squeezing of the cables could occur.

Figure 2:
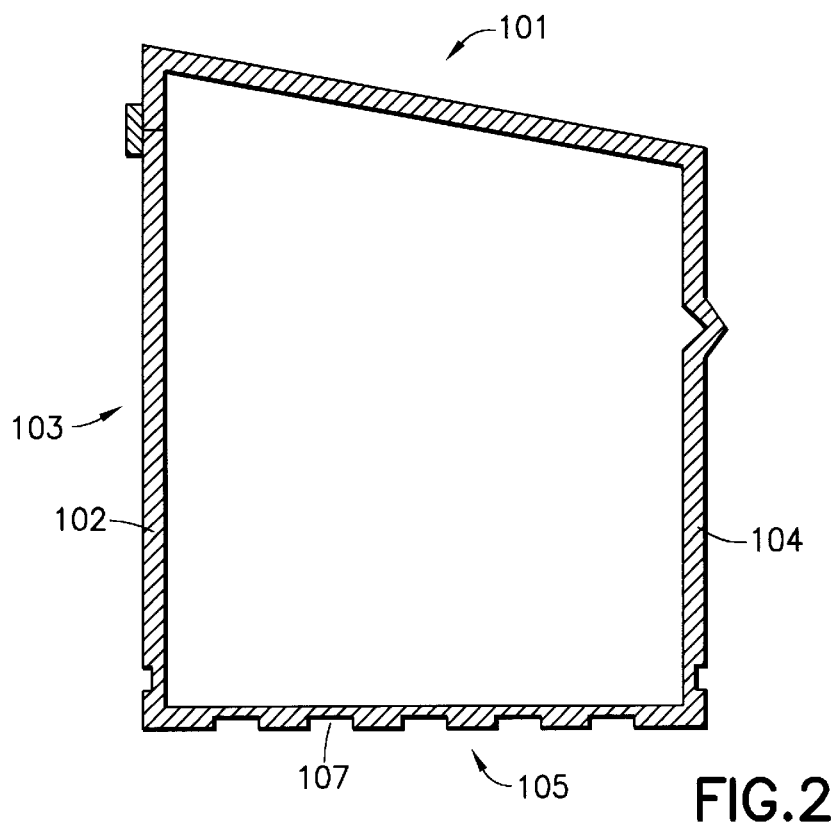
FIG. 2 is a cross section of a protector according to a second embodiment of the invention.

In a second embodiment shown in FIG. 2, a weakened wall portion 105 extends into side walls 102, 104 in the case that the space below the protector 101 is not free, or it is preferred to move the cables in a specific direction. In this embodiment, notches 107 are provided on an outer surface in the lower area of the protector 101.

Figure 3:
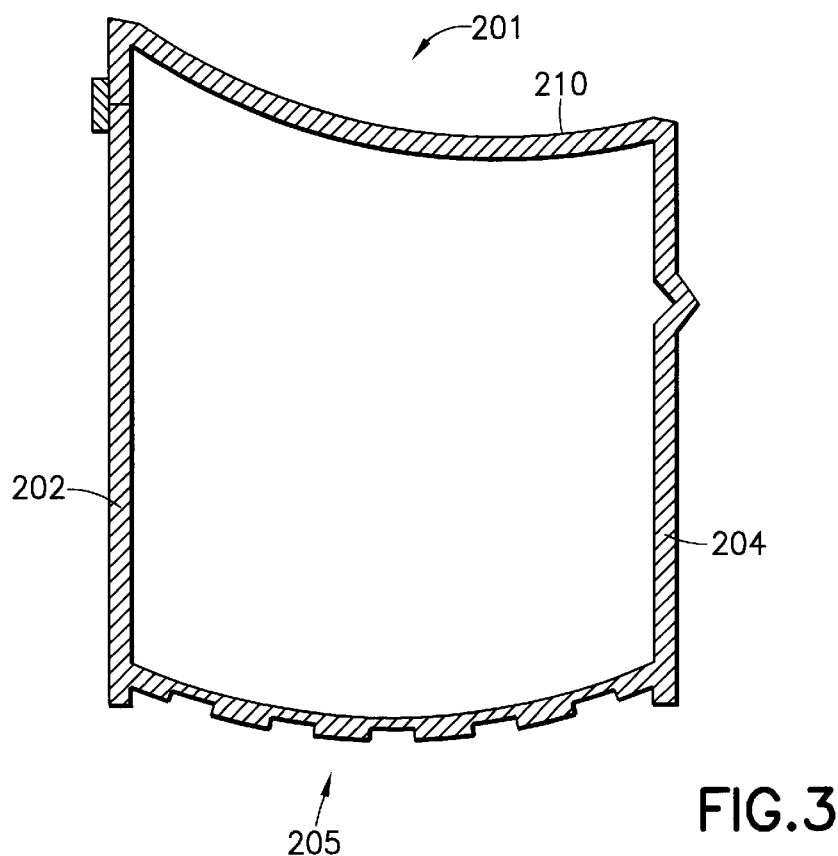
FIG. 3 is a cross section of a protector according to a third embodiment of the invention.

In a third embodiment shown in FIG. 3, a weakened wall portion 205 and a wall portion located substantially opposite thereto are designed such that they will be deformed substantially in the same direction upon the deformation of a protector 201. In particular, when the lower wall portion forms the weakened wall portion 205 which is designed to deform downwardly, a cover 210 may have a slightly curved form such that, when side walls 202, 204 of the protector 201 are compressed toward each other, the curved or concavely formed cover 210 will also be deformed downwardly, thereby touching and pressing the contained cables downwardly toward the area that has been freed by the deformed weakened wall portion 205, i.e. the deformation of the cover 210 assists the action of gravity on the contained cables. Regarding further features of the foregoing embodiments, reference is made to the description of the first embodiment.

The geometry of the protector itself may be such that, upon deformation of the protector, the displacement of the cables toward the location of the weakened wall portion is facilitated. For example, the inner surface of the protector may be polished or smoothed, so that it may act as a sliding face in order to facility displacement of the contained cables. Alternatively, or additionally a biasing means may be provided to bias the contained cables toward the weakened wall portion. For example, the biasing means may be a spring provided in the cover. The spring may be a leaf spring, a coil spring or the like which is mounted to the cover and is operative to urge the cables toward the bottom wall.

Specifically, upon a serious accident, the weakened wall portion will break open due to squeezing of the side walls, thereby allowing the cables to fully escape from the protector toward the portion of the car body where there is no risk of being squeezed.

Figure 4:
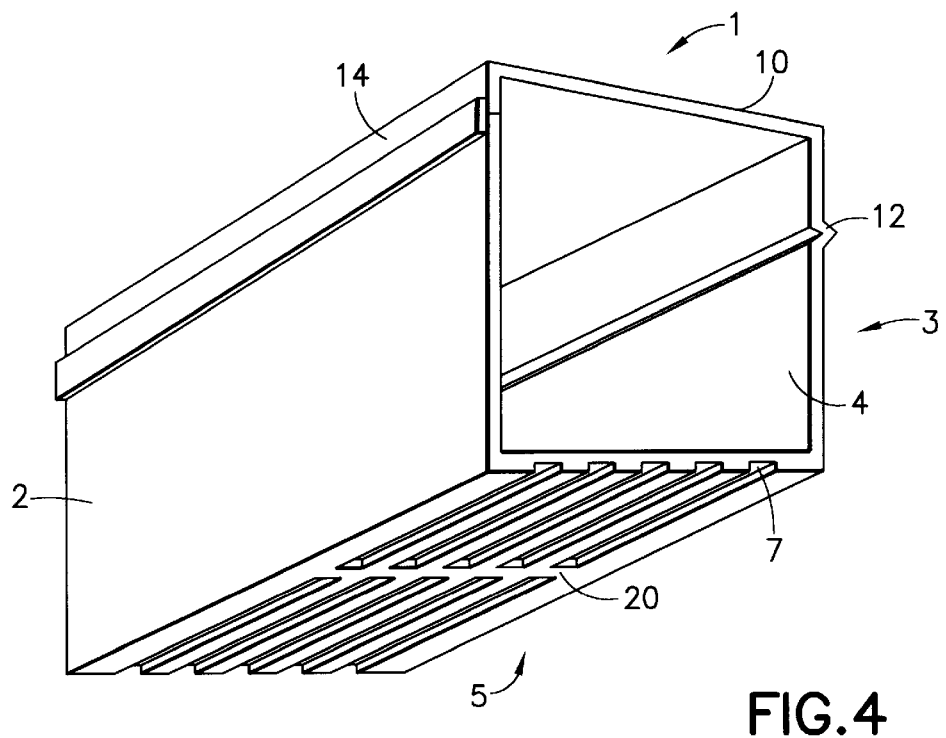
FIG. 4 is a perspective view of the protector of FIG. 1.

As shown in FIG. 4, the notches 7 at the outer surface of the weakened wall portion 5 extend substantially over the entire length of the protector, being separated into two portions by a web 20. The material thickness of the web 20 corresponds in the shown embodiment to the thickness of the weakened wall portion 5, where no notches 7 are formed. However, the thickness of the web 20 may also be larger in order to provide further reenforcement or may be formed of an other suitable material. In the perspective view of FIG. 4, only short portions on both sides of the web 20 of the preferred protector are shown. Although the elongated body of the protector has a straight configuration in the shown embodiment, it may have a curved, zigzag or other suitable configuration depending upon the requirements of the car construction which is to be equipped with the inventive protector.

It should be noted that portions of the cables contained in the protector should be longer than the length of the protector itself, in particular in order to allow the cables to fall out of the protector when the weakened wall portion breaks open. Further, the portions of the cables contained in the protector should neither be bound nor connected with one another in order to avoid jamming when the displacement of the cables is desired. Further, by using unbound cables, single cables of the wiring harness can easily be replaced.

Figure 5:
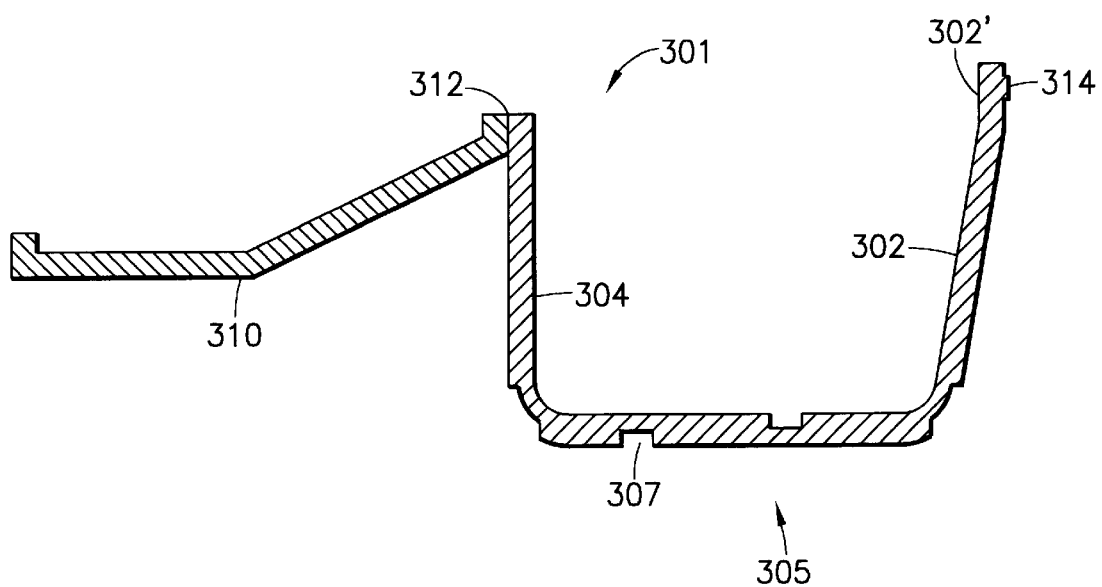
FIG. 5 is a cross section of a protector according to a fourth embodiment of the invention.

A particularly preferred protector as shown in FIG. 5 basically has the same configuration as the foregoing embodiments. In FIG. 5, a protector 301 is shown with an opened cover 310 which is connected with an upright side wall 304 via a hinge means 312. The junction of the upright side wall 304 and the lower wall portion is curved. On the opposite side of the lower wall portion, there is formed another curved junction linking the lower wall portion with a substantially slanted side wall portion 302. The side wall portion 302 is connected with an upper upright side wall 302' which is equipped with a locking mechanism 314 provided to cooperate with the cover 310.

Figure 6:
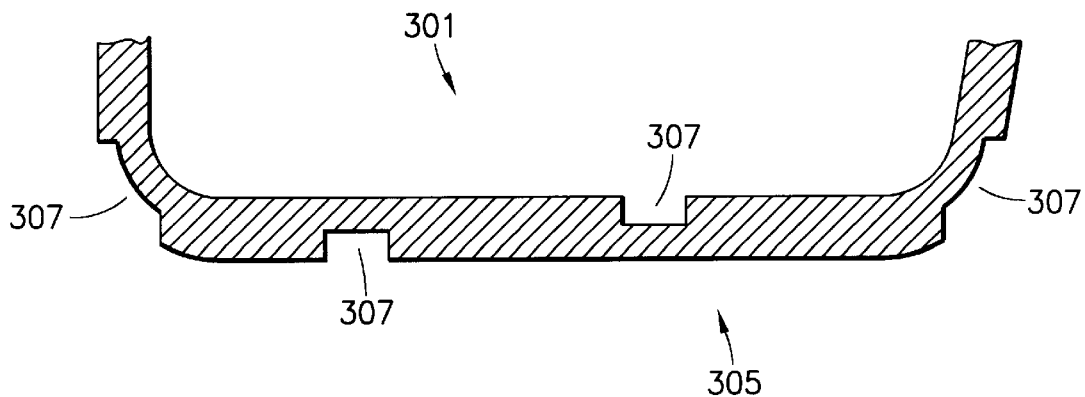
FIG. 6 is an enlarged cross section of the lower portion of the protector FIG. 5.

FIG. 6 shows the lower portion of the protector 301 of FIG. 5 in more detail. In particular, the rounded junctions between the lower wall portion and the side wall portions 302, 304 are thinned by forming notches 307 in the outer surface of the protector 301. Additionally, in this specific embodiment, the lower portion of the protector, i.e. a weakened wall portion 305 comprises one notch 307 in each of the inner and outer surfaces thereof. The depth of the notches 307 corresponds approximately to ⅓ to ½ of the material thickness adjacent thereto. The notches 307 on the inner and outer surfaces of the lower wall portion are preferably offset with respect to each other as shown in FIG. 6. The protector as shown in FIGS. 5 and 6 may also include any one or combination of features of the foregoing embodiments.

The fail-safe function of the protector 1 is described below.

Figure 7:
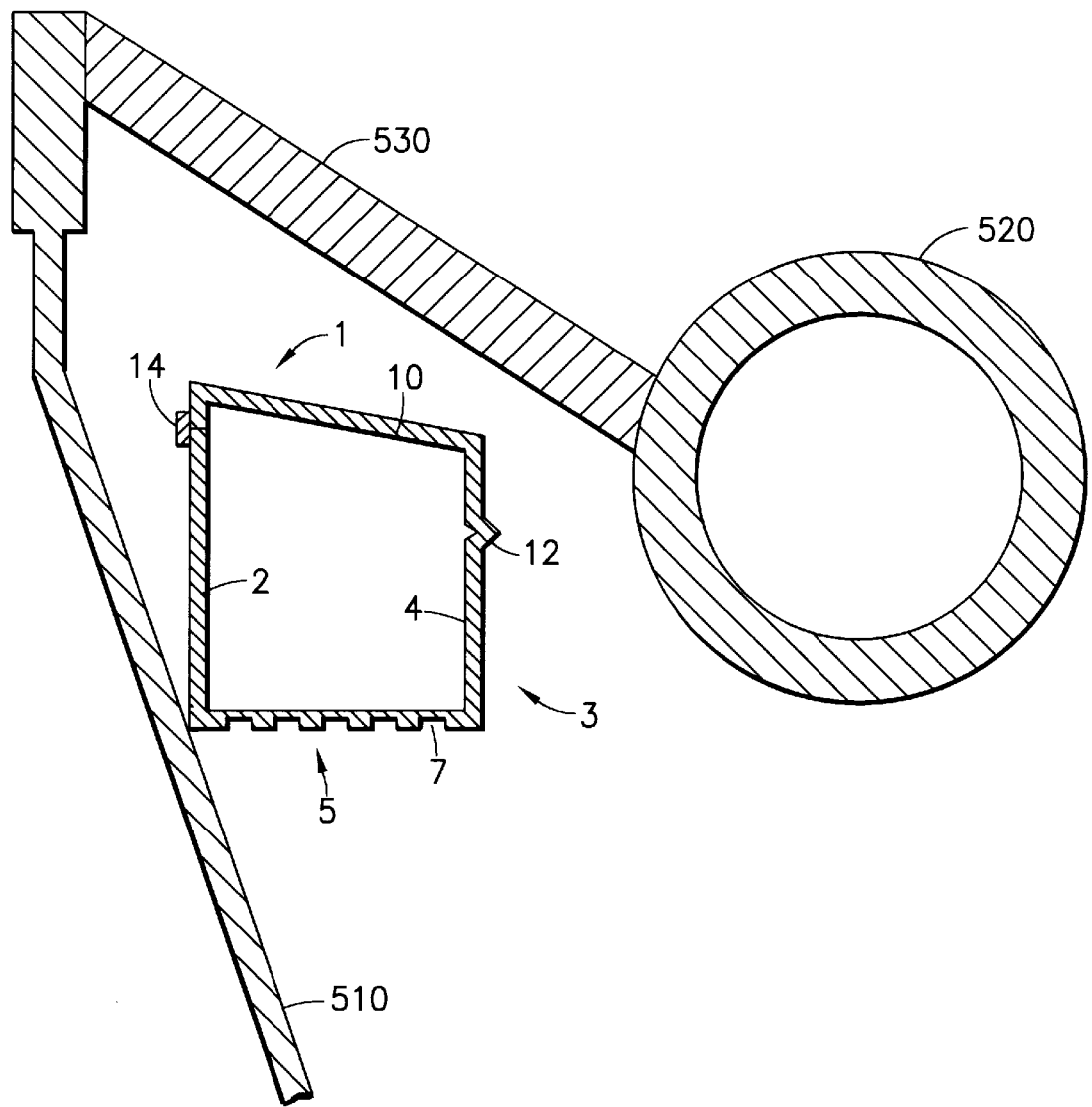
FIG. 7 is a cross-sectional diagram showing a typical arrangement of the protector of FIG. 1 between a cowl panel and a reinforcement member.

The protector 1 as shown in FIGS. 1 to 6 is preferably mounted on a portion or a panel of a car body, specifically as shown in FIG. 7 between a cowl panel 510 and a reinforcement member 520 of the car body within the passenger compartment. The reinforcement member 520 made of a metal bar and extending in a transverse direction with respect to the length of the car body is mounted via a mounting web 530 of, e.g. metal which extends in lengthwise direction as shown in FIG. 7. The protector 1 contains several unbound cables of the wiring harness which are connected with different electrical devices of a vehicle. In the case of a head-on collision, wiring harness or cables contained in a protector according to the prior art might be trapped between the cowl panel and the reinforcement member, if the deformation of one or both of these elements occurs. In a serious accident, the cables might be squeezed by the cowl panel and the reinforcement member, thereby making a short circuit likely to occur. Contrary to this, when the inventive protector is used, the loosely contained cables will be able to escape the impact or squeezing zone. When a thrust is applied to the protector 1, the thinned wall portion 5 will be deformed, providing a space for the cables to escape. If a certain predetermined amount of deformation of the protector 1 occurs, the protector 1 will open, either by disengaging an unillustrated engagement means or by breaking the frangible weakened wall portion, thereby further providing an escape space for the cables. When the protector 1 is mounted in a preferred horizontal alignment, gravity helps the cables to move toward the deformed or opened weakened wall portion.

The use of the inventive protector substantially avoids a risk of squeezing cables and a resulting short circuit as the cables are permitted to fall, move or even be expelled from the squeezing zone.

What is claimed is:

1. A protector for accommodating cables therein, comprising an elongated tubular body (1;101;201;301) having opposed side walls of a selected rigidity extending continuously along said tubular body, said tubular body further having a top wall and an opposed bottom wall (5;105;205;305) extending between and connecting said side walls, said bottom wall having at least one weakened portion (7;107;207;307) such that said bottom wall (5;105;205;305) is less rigid than said opposed side walls and is configured to be deformed outwardly in response to deformation of said side walls toward one another for permitting a displacing of the cables away from said side walls and thereby preventing damage to said cables due to the deformation of said side walls.

2. A protector according to claim 1, wherein the weakened wall portion (5;105;205;305) is openable when a predetermined amount of deformation occurs.

3. A protector according to claim 1, wherein the weakened wall portion (5;105;205;305) comprises a portion which is disengageable from remaining portions of said tubular body upon deformation.

4. A protector according to claim 1, wherein the weakened wall portion (5;105;205;305) is thinned at at least selected locations (7;107;207;307).

5. A protector according to claim 1, wherein the weakened wall portion (5;105;205;305) comprises a material having lower rigidity than material of remaining portions of the protector.

6. A protector according to claim 1, wherein the elongated body is configured such that the deformation of the elongated body (1;101;201;301) urges the cables to the weakened wall portion (5;105;205;305).

7. A protector according to claim 1, wherein the weakened wall portion (5;105;205;305) extends in the longitudinal direction over the entire length of the elongated body (1;101;201;301).

8. A protector according to claim 7, wherein the weakened wall portion is separated into at least two sections by at least one transversely extending web.

9. A protector according to claim 1, wherein the weakened wall portion (5;105;205;305) and a wall portion substantially opposite thereto are designed such that they are deformable in the same direction.

10. A protector according to claim 1, further comprising biasing means for biasing the cables toward the weakened wall portion (5;105;205;305).

11. A protector according to claim 1, wherein the elongated body comprises an openable cover connected to a main body.

12. A protector according to claim 11, wherein the cover is connected to the main body by a hinge.

13. A protector according to claim 11, wherein the cover comprises engaging means for securing the cover to the main body.

* * * * *